United States Patent
Muranami

(10) Patent No.: US 6,710,768 B2
(45) Date of Patent: Mar. 23, 2004

(54) INTEGRATED MULTI-FUNCTION COMPUTER INPUT DEVICE

(75) Inventor: Masahiko Muranami, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 174 days.

(21) Appl. No.: 09/767,670

(22) Filed: Jan. 22, 2001

(65) Prior Publication Data

US 2002/0097225 A1 Jul. 25, 2002

(51) Int. Cl.[7] .................................................. G09G 5/08
(52) U.S. Cl. ....................... 345/166; 345/156; 345/157; 345/158; 345/163; 345/164; 345/165; 345/166; 345/167; 358/473
(58) Field of Search ................................ 345/156, 157, 345/158, 163, 166, 164, 165, 167; 358/473; 382/313, 334, 338

(56) References Cited

U.S. PATENT DOCUMENTS

| | | | | |
|---|---|---|---|---|
| 5,355,146 A | * | 10/1994 | Chiu et al. .................. | 345/156 |
| 5,535,147 A | * | 7/1996 | Jacobs et al. ................ | 708/111 |
| 5,633,489 A | * | 5/1997 | Dvorkis et al. .............. | 235/472 |
| 5,994,710 A | * | 11/1999 | Knee et al. .................. | 250/557 |
| 6,116,508 A | * | 9/2000 | Cruciani ................. | 235/462.13 |

\* cited by examiner

*Primary Examiner*—Richard Hjerpe
*Assistant Examiner*—Jennifer T. Nguyen

(57) ABSTRACT

An input device functions as both a pointing device and a scanning device. The input device can have a switch with a first position in which the input device functions as a pointing device and a second position in which the input device functions as a scanning device. When operating as a scanning device, the input device can have two modes of scanning operation: a document scan mode and a virtual scan mode. In the document scan mode, the input device can scan an image on a document page. In the virtual scan mode, the input device can scan an image on an electronic page. The input device can include a multi-functional scanning system that can scan an image horizontally, vertically, or any angle diagonally relative to a document or electronic page.

19 Claims, 5 Drawing Sheets

INTEGRATED MULTI-FUNCTION COMPUTER INPUT DEVICE

TECHNICAL FIELD

This invention relates to a computer input device, and specifically to an integrated imaging device computer mouse.

BACKGROUND

A computer mouse is an input and pointing device that emulates computer keyboard inputs to a computer and enables a user to translate hand position and movement to control the position of a cursor on a video display connected to the computer. A computer mouse offers user convenience to position a cursor, select an input control, or hi-light text when utilizing a computer application and/or operating system displayed as a graphic interface on a computer display. Such interfaces include "Windows", "Macintosh", and "OS/2".

A mechanical mouse typically describes a mouse that incorporates a rubber ball extending from the underside of the mouse. As the mouse is moved, the rubber ball rotates over a work surface such as a mouse pad. Inside the mouse, the rubber ball contacts two rollers mounted perpendicular to each other. The rollers are moved via the rubber ball when the rubber ball rotates over the work surface. One roller responds to back and forth movements of the mouse, which corresponds to vertical movements of a cursor on a display. The other roller responds to sideways movements of the mouse, which corresponds to side-to-side movements of the cursor on the display.

A conventional mouse typically has one or more input buttons or switches that can be depressed, or "clicked", to signal a software application to select an input control or position the cursor. The input to the application typically depends upon the position of the cursor on the display. A mouse may also have a scrolling wheel or roller device controllable by a user that functions as an input to scroll a display up or down, and also to operate as an input button when depressed.

The electrical signals generated within a mouse and corresponding to a user's hand movements are sent via a cable from the mouse to the computer. The signals are translated from the movement of the rollers, via encoders in the mouse, and are processed with software executing on a processor in the computer to convert the number, combination, and frequency of signals into the distance, direction, and speed necessary to move an on-screen cursor. A mouse can also be wireless in which case the signals are propagated from the mouse to the computer via infrared or ultraviolet technologies.

An optical mouse typically describes a mouse that replaces the rubber ball, rollers, mechanical encoders, and other mechanical parts of a mechanical mouse with a digital optical sensor and a digital signal processor. Rather than relying on the frictional engagement of the rubber ball on a mouse pad, the optical sensor senses patterns of light and dark or colors on a specifically designed mouse pad or work surface. Alternatively, an optical mouse can be made to operate over any surface that has a random pattern of relatively light and dark areas.

As with a mechanical mouse, an optical mouse can be wired or wire-less, and communicate with a computer via infrared and/or ultraviolet technologies. An optical mouse can also have any number of programmable inputs, such as buttons or switches, to effectuate the input controls of a computer keyboard to a computer.

A computer mouse is a one-dimensional input and pointing device having the limited function of emulating computer keyboard inputs to a computer. Many single-function computer peripheral devices offer user convenience in exchange for the expense of purchasing several different devices, and in exchange for work space. With the ever-increasing need for portable computing in a limited space, such as on an airplane, in a car, or in a small office, there is a need for multi-functional, portable and compact computer peripheral devices.

SUMMARY

An input device functions as both a pointing device and a scanning device. The input device can have a switch with a first position in which the input device functions as a pointing device and a second position in which the input device functions as a scanning device. The input device can be an optical mouse having an optical sensor to detect the direction of movement of the input device.

The input device has a multi-directional scanning system to scan an image. The scanning system can scan an image in a direction horizontal to a document page, in a direction vertical to a document page, or in any direction that is, to some angle of degree, diagonal to a document page. When operating as a scanning device, a first scanning optical system is activated to scan an image in a horizontal direction when the optical sensor senses a horizontal movement of the input device. A second scanning optical system is activated to scan an image in a vertical direction when the optical sensor senses a vertical movement of the input device. Both scanning optical systems are activated to scan an image in a diagonal direction.

The input device has multi-function user-engageable switches that are associated with the pointing device when the input device is functioning as a pointing device. The same switches are associated with the scanning device when the input device is functioning as a scanning device.

When operating as a scanning device, the input device has multiple scan modes. The scanning device can have a switch that toggles between a document scan mode and a virtual scan mode. In the document scan mode, the input device can scan an image on a document page. In the virtual scan mode, the input device can scan an image on an electronic page.

BRIEF DESCRIPTION OF THE DRAWINGS

The same numbers are used throughout the drawings to reference like features and components.

DETAILED DESCRIPTION

An integrated computer input device that functions both as a pointing device and as a scanning device offers user convenience, multi-function capabilities, and the benefit of saving work space both in an office and when traveling. A computer mouse having an integrated scanner makes scanning documents as easy as using a mouse and reduces user costs with the combined functionality. In the described embodiments, the computer input device is described as an optical mouse having a scanner integrated with the mouse. However, the invention is also applicable to other types of computer input or pointing devices such as a mechanical mouse, a trackball, a pen input device, and the like.

Figure 1:
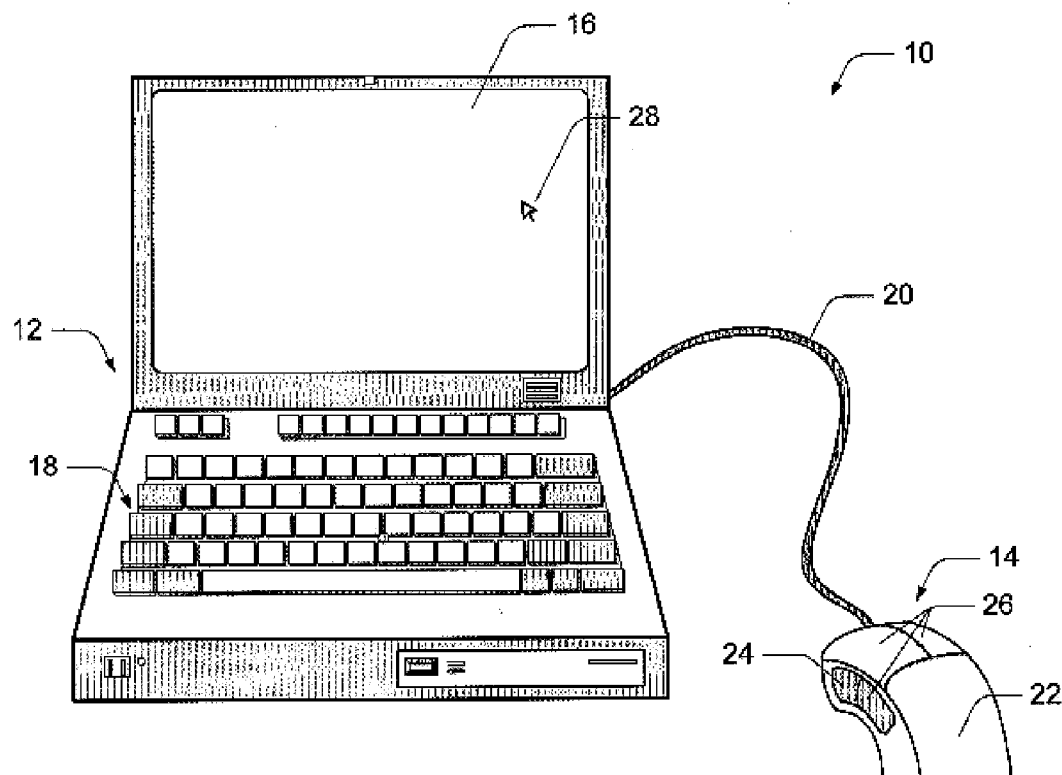
FIG. 1 is an illustration of a mouse integrated with a scanning device and connected to a computing device.

FIG. 1 shows a computing system 10 having a computing device 12 and an optical computer mouse 14 integrated with scanning components. The computer 12 has a display 16 and a keyboard 18. Electronic signals generated with the mouse 14 are sent via a cable 20 from the mouse 14 to the computer 12. Additionally, the mouse 14 can receive operational power from the computer 12 via the cable 20.

The mouse 14 has a housing 22 and programmable buttons, or switches 24, 26 that are integrated with the housing 22. The switches 24, 26 can be programmed to control a function of an application executing on the computer 12, or programmed to control a function of the mouse 14. For instance, switch 24 operates to toggle between a first position in which the mouse 14 functions as a pointing device and a second position in which the mouse 14 functions as a scanning device. The programmable switches 26 are associated with either the functions of the pointing device or the functions of the scanning device dependent upon the toggled position of switch 24 and the selected mode of the input device.

A cursor 28 is illustrated as being displayed on the computer display 16. The switches 26 can be depressed, or "clicked", to signal a software application to select an input control or position the cursor 28 on the display 16. Additionally, the direction of movement of the mouse 14 is translated to the movement of the cursor 28 on the display 16 when the mouse 14 is switched to function as a pointing device with switch 24. That is, moving the mouse 14 to the left or right will move the cursor 28 left or right on the display, respectively. Similarly, moving the mouse 14 forward and back will move the cursor 28 up and down on the display.

The mouse 14 can be implemented with any number of switches 24, 26 and in any number of programmable configurations. Additionally, the mouse 14 may also have a scrolling wheel or roller device (not shown) that can also be configured as a programmable input switch. A mouse having four buttons and a scrolling wheel would provide a five function selectable configuration, for example.

Figure 2:
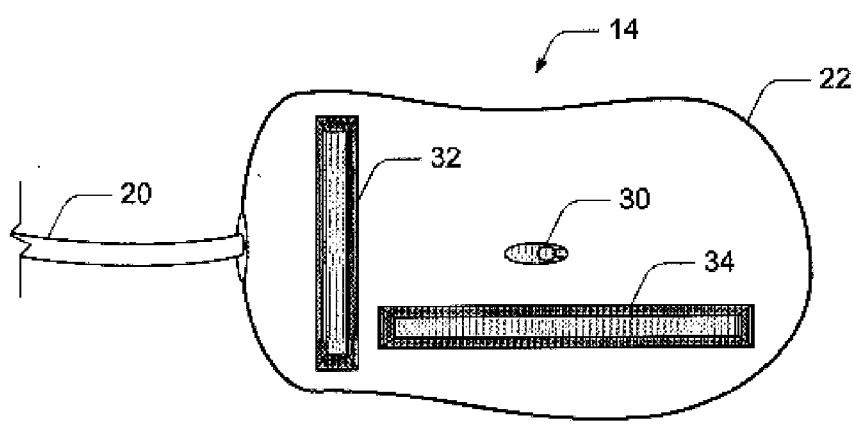
FIG. 2 is an illustration of the bottom of an optical mouse integrated with a scanning device.

FIG. 2 shows a configuration of the bottom of the optical computer mouse 14 integrated with scanning components. The mouse 14 has an optical sensor 30 that facilitates the mouse 14 functioning as a pointing device. The mouse 14 also has scanning optical systems 32, 34 positioned perpendicular to each other to facilitate the mouse 14 functioning as a scanning device. The scanning optical systems 32, 34 can be implemented in any number of configurations. For example, if the mouse 14 is designed with only scanning optical system 32, the mouse 14 can be utilized to scan an image by moving the mouse 14 in a forward and/or back direction. If the mouse 14 is designed with only scanning optical system 34, the mouse 14 can be utilized to scan an image by moving the mouse 14 side-to-side over the image.

As illustrated, both scanning optical systems 32, 34 can be implemented together to scan an image in coordination with the direction of movement of the mouse 14 as detected by the optical sensor 30. For example, if the optical sensor 30 detects that the mouse is moving sideways (or horizontally in relation to a document), scanning optical system 34 is activated to capture the image. Alternatively, if the optical sensor 30 detects that the mouse is moving forward or back (or vertically in relation to a document), scanning optical system 32 is activated to capture the image. If the optical sensor 30 detects that the mouse is moving in a diagonal direction in relation to a document, both scanning optical systems 32, 34 can be activated to capture the image.

Figure 3:
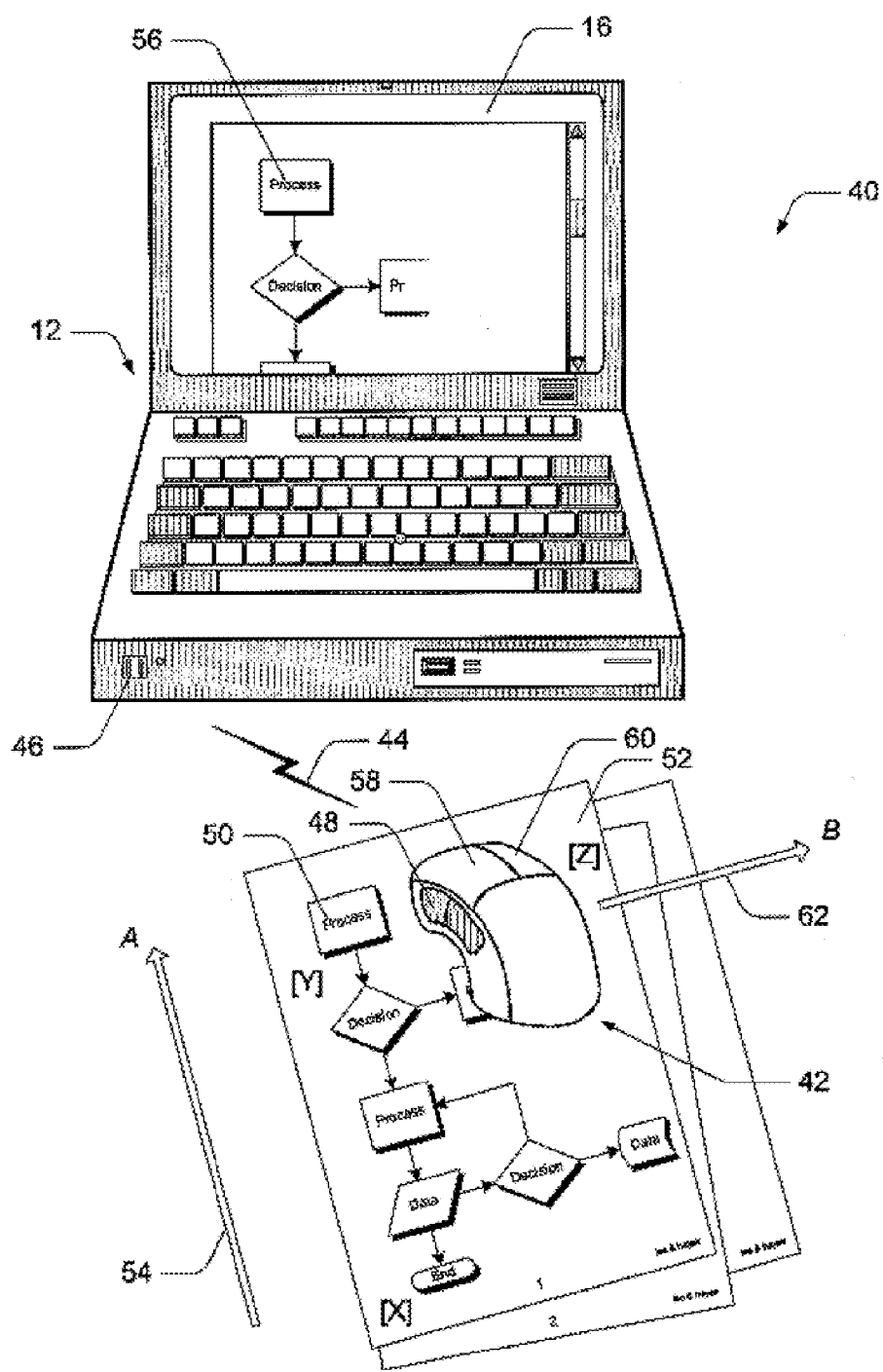
FIG. 3 is an illustration of a wireless mouse integrated with a scanning device to scan a document image.

FIG. 3 shows a computing system 40 that illustrates an example of a wireless optical computer mouse 42 communicatively linked to the computer 12 via an infrared or ultraviolet transmission signal 44 that is received at a detector/receiver 46 in the computer. The mouse 42 can also be communicatively linked to the computer 12 via radio wave technology, such as Bluetooth, for example. The mouse 42 has a function switch 48 that operates to toggle between a first position in which the mouse 42 can be utilized as a pointing device and a second position in which the mouse 42 can be utilized as a scanning device.

FIG. 3 illustrates mouse 42 being utilized as a scanning device as it scans an image 50 on a document page 52. Starting the mouse 42 at position [X] in the lower right corner of document page 52, the mouse 42 is moved in a direction A, identified by arrow 54, to a position [Y]. As described above, the optical sensor 30 detects that the mouse 42 is moving forward (or vertically in relation to document page 52) and scanning optical system 32 is activated to capture the image 50. The image 50 is displayed on the computer display 16 as the scanned image 56 while the mouse 42 is scanning document page 52. Alternatively, the image 50 can be captured and stored in a memory component in the mouse 42 to be downloaded to the computer 12 at a later time.

Multi-functional, user-engageable switches 58, 60 can be programmed to be associated with a function of the scanning device when the mouse 42 is switched to the scanning mode. An alternative to the optical sensor 30 detecting that the mouse 42 is moving in the direction A, and activating scanning optical system 32, a user can depress switch 58 to activate the scanning optical system 32 when scanning in a forward or back direction.

Continuing to scan the image 50 on document page 52, the mouse 42 moves from position [Y] in a direction B, identified by arrow 62, to a position [Z]. The optical sensor 30 detects that the mouse 42 is moving sideways (or horizontally in relation to document page 52) and scanning optical system 34 is activated to capture the image 50. Alternatively, a user can depress switch 60 to activate the scanning optical system 34 when scanning in a sideways direction.

Figure 4:
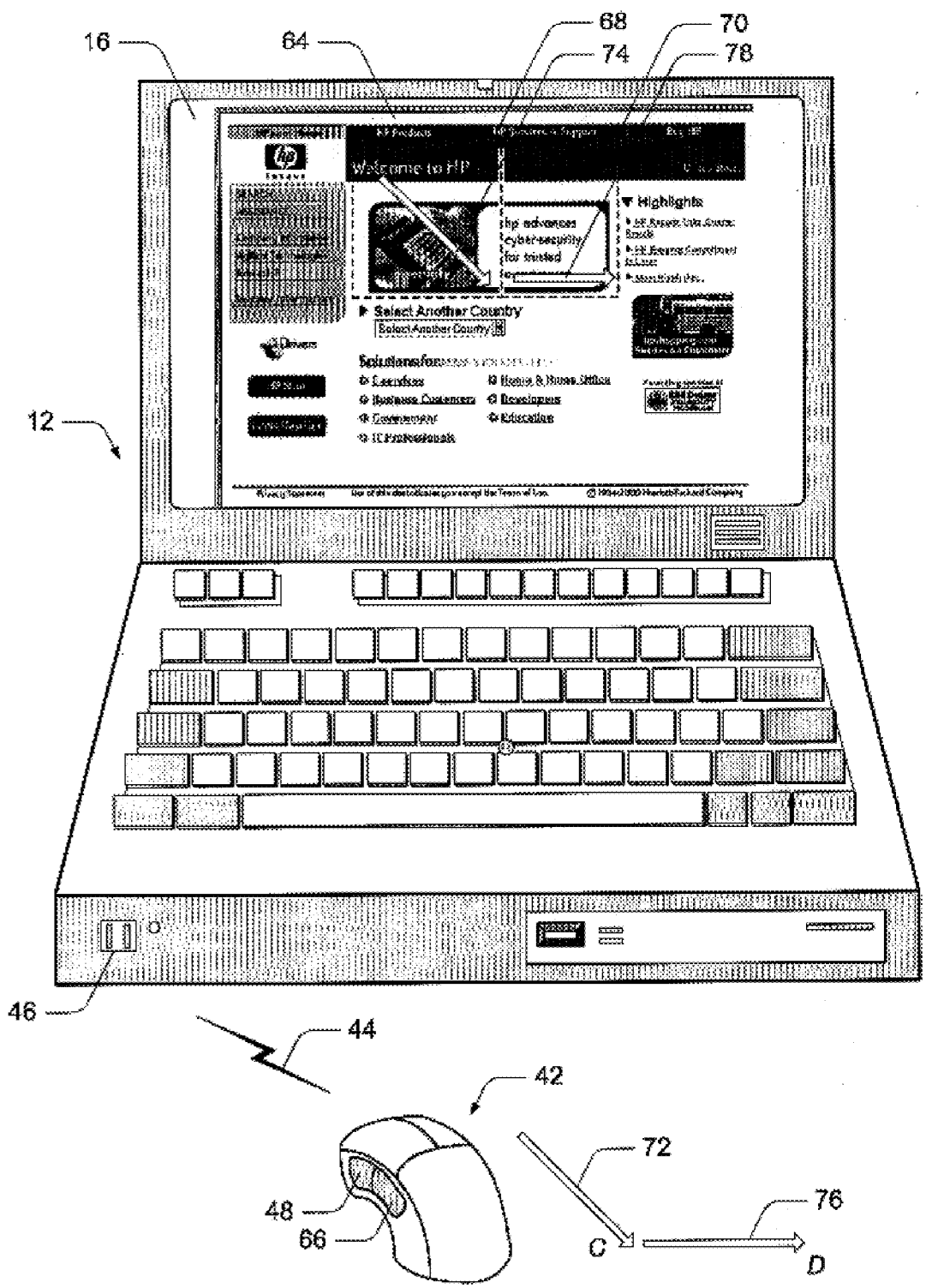
FIG. 4 is an illustration of a wireless mouse integrated with a scanning device to scan a virtual image.

FIG. 4 illustrates a wireless optical computer mouse 42 being utilized as a virtual scanning device and scanning an image on an electronic page 64 displayed on computer display 16. Programmable switch 66 toggles between a document scan mode and a virtual scan mode when switch 48 is toggled such that the mouse 42 can be utilized as a scanning device.

In the document scan mode, the mouse 42 can scan an image 50 on a document page 52 as shown in FIG. 3. In the virtual scan mode, the mouse 42 can scan an image 68, 70 on an electronic page 64. Electronic page 64 is shown as an Internet Web-site home page for the Hewlett-Packard Company. However, the electronic page 64 can be any electronic display that includes text, pictures, hyperlinks, graphics, tables, frames, and the like that can be virtually scanned.

Moving the mouse 42 in a direction C, identified by arrow 72, the image area 68 is captured with the scanning device. Arrow 74 depicted in image area 68 shows the correlation between moving the mouse 42 in direction C and the resulting scanned image area 68. When moving the mouse 42 in a direction D, identified by arrow 76, the image area 70 is captured with the scanning device. Arrow 78 depicted in image area 70 shows the correlation between moving the mouse 42 in direction D and the resulting scanned image area 78. The scanned images 68, 70 can be captured and stored in a memory component in the computer 12, or stored in a memory component in the mouse 42 to be downloaded at a later time.

Figure 5:
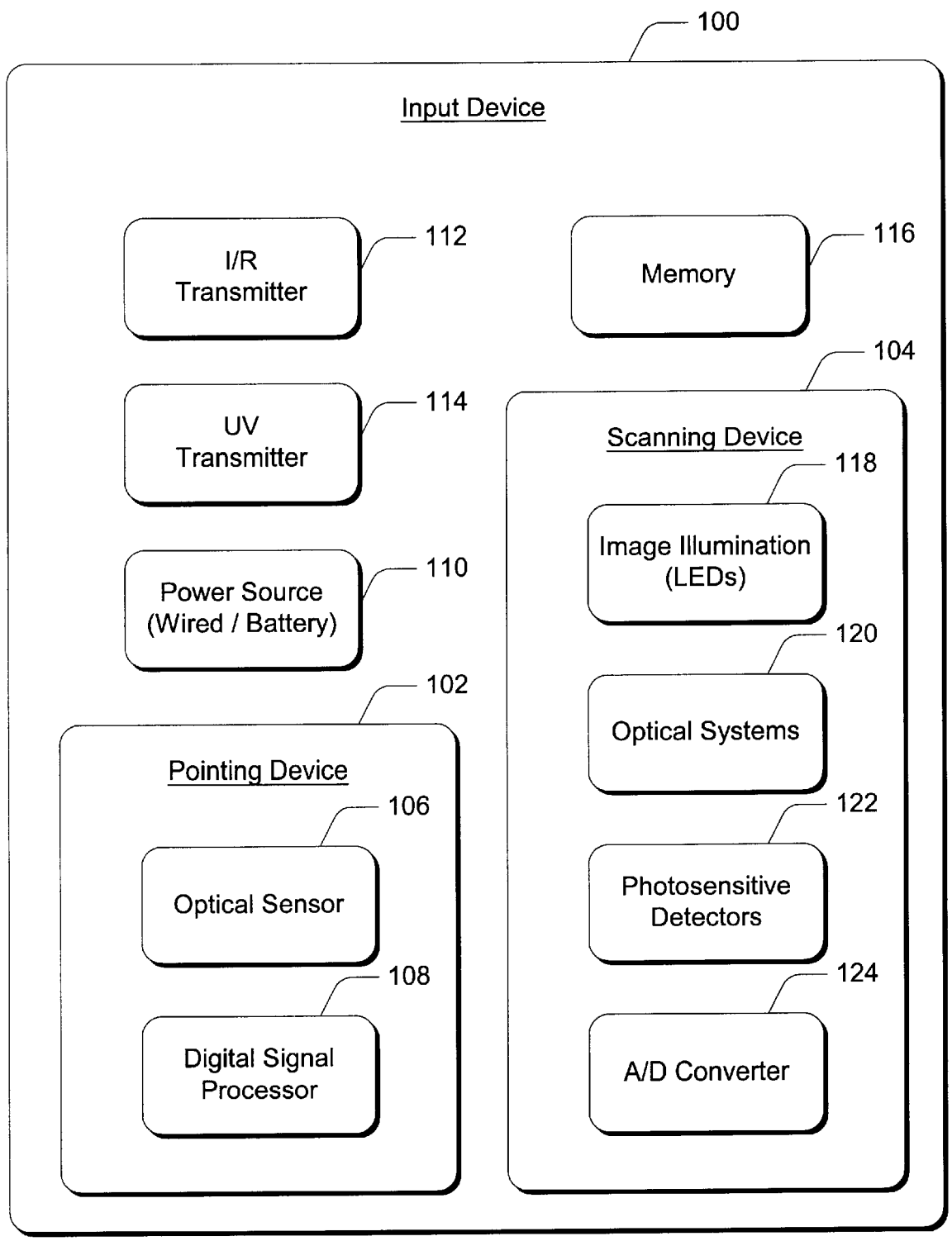
FIG. 5 is a block diagram that illustrates the components described in an embodiment of the invention.

FIG. 5 illustrates the components of an input device 100 having a pointing device 102 and a scanning device 104 integrated together. In the illustrated embodiment, the pointing device 102 is an optical mouse having an optical sensor 106 and a digital signal processor 108. For a mechanical mouse, the pointing device would have a rotatable ball, rollers, mechanical encoders, and the other mechanical parts necessary to implement the pointing device as a mechanical mouse.

The input device 100 has a power source 110 that can be derived from a battery source, from a computer over a mouse cable connecting the input device and the computer, or from any number of other configurable power sources. For a wireless input device, or for an input device having a detachable cable, the input device 100 can have an infrared transmitter 112, an ultraviolet transmitter 114, or both. The input device also has a memory component 116 to store images captured with the scanning device 104.

The scanning device 104 can be implemented as an optical scanner that produces machine-readable image data signals that are representative of a scanned image, such as a photograph or a page of printed text. The image data signals produced by the scanning device 104 can be used to reproduce the scanned image on a display device, such as a computer display or a printer.

The scanning device 104 has an image illumination component 118 to illuminate an image to be scanned. The illumination component 118 can be any suitable light source such as a fluorescent or incandescent lamp, or an array of LEDs (light emitting diodes) to illuminate the image to be scanned. The scanning device also has optical systems 120, a photosensitive detector 122, and an analog-to-digital (A/D) converter 124. The optical systems 120 include reflective components to direct an image to be scanned onto a lens assembly.

The photosensitive detector 122 can be implemented with a charged coupled device (CCD) designed to detect subtle changes of light detected when scanning an image and to register the amount of light as a voltage level that corresponds to a color. The A/D converter 124 process the voltages generated by the CCD and the resulting digital signals can then be processed for display and/or stored in memory 116.

Figure 6:
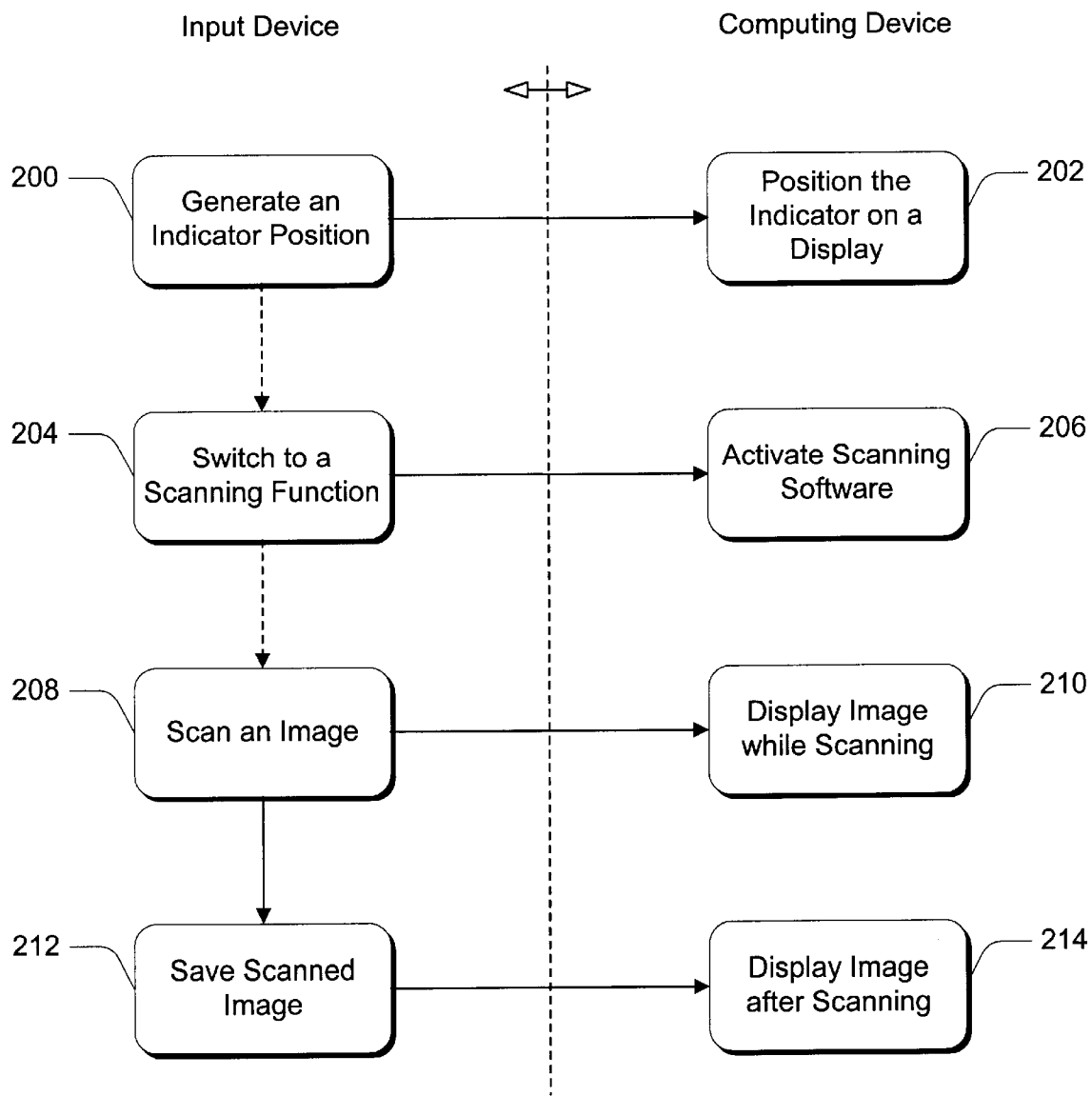
FIG. 6 is a flow diagram that describes a method to operate a pointing device that is integrated with a scanning device.

FIG. 6 illustrates a method to operate an input device that functions as both a pointing device and a scanning device. As a pointing device, the input device operates as a computer mouse and an indicator or cursor position input can be generated with the mouse at block 200. The cursor position input is translated to move and/or display a cursor on a computer display at block 202. At block 204, the functionality of the input device can be switched to that of a scanning device. When switching the input device to operate as a scanning device, scanning software can be activated in a computer that is communicatively linked to the input device at block 206.

At block 208, an image can be scanned when the input device is operating as a scanning device. As described above, the input device can scan an image in a document scan mode or in a virtual scan mode when operating as a scanning device. The scanned image can be displayed on a computer display (block 210) while scanning the image (e.g., in the document scan mode). Alternatively, the scanned image can be stored in memory (block 212) to be displayed at a later time in the form of an electronically displayed image on a computer display, or as a printed image (block 214) (e.g., in the document scan mode or in the virtual scan mode).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. An input device, comprising:
    a pointing device;
    a scanning device integrated with the pointing device; and
    the pointing device comprising a switch to toggle between
        a document scan mode in which the input device is configured to scan an image on a document page, and
        a virtual scan mode in which the input device is configured to scan an image on an electronic page, wherein the electronic page is rendered on a display.

2. An input device as recited in claim 1, wherein the pointing device comprises a wireless mouse.

3. An input device as recited in claim 1, wherein the pointing device comprises a mouse having a detachable cable.

4. An input device as recited in claim 1, wherein the pointing device comprises an optical mouse.

5. An input device as recited in claim 1, wherein the pointing device is a mouse and further comprising a memory to store an image captured with the scanning device.

6. An input device as recited in claim 1, wherein the pointing device is a mouse having a second switch, the second switch being configured to toggle between a first position in which the input device functions as the pointing device and a second position in which the input device functions as the scanning device.

7. An input device as recited in claim 6, wherein the input device is configured to activate scanning software in a computing device when the second position of the second switch is selected.

8. An input device as recited in claim 1, further comprising a second switch to activate the scanning device, wherein the input device is configured to activate scanning software in a computing device when the second switch activates the scanning device.

9. An input device as recited in claim 1, further comprising:
    an optical sensor to sense the direction of movement of the input device;
    a first scanning optical system being configured to scan an image in a first direction relative to a document page; and
    a second scanning optical system being configured to scan an image in a second direction relative to the document page, the second direction being different than the first direction.

10. An input device as recited in claim 9, wherein the scanning optical systems are configured to be activated when the optical sensor senses a movement of the input device.

11. A system, comprising:

a computing device having a display and a processor;

an input device communicatively linked to the computing device to operate as both a pointing device and a scanning device, the input device being configured to generate an input to the processor and the processor being configured to translate the input for rendering on the display; and wherein the input device comprises a switch to toggle between a document scan mode in which the input device is configured to scan an image on a document page, and a virtual scan mode in which the input device is configured to scan an image on an electronic page, wherein the electronic page is rendered on the display.

12. A system as recited in claim 11, wherein the input device further comprises a second switch having a first position configured to activate the pointing device, and a second position configured to activate the scanning device.

13. A system as recited in claim 11, wherein the input device further comprises a memory to store the image captured from the document page and the image captured from the electronic page.

14. A system as recited in claim 11, wherein the input device is configured to activate scanning software in the processor when the scanning device is activated.

15. A method, comprising:

positioning an indicator on a display corresponding to an input generated with an input device functioning as a pointing device;

switching functionality of the input device from a pointing device to a scanning device;

toggling the scanning device from a document scan mode to a virtual scan mode; and scanning an image with the input device functioning as the scanning device in the virtual scan mode, the image being a section of an electronic page rendered on the display, wherein the scanning comprises capturing the image with a virtual scan of the electronic page section.

16. A method as recited in claim 15, further comprising activating scanning software upon said switching.

17. A method as recited in claim 15, further comprising displaying the image on the display while scanning the image.

18. A method as recited in claim 15, further comprising saving the image in a memory in the input device.

19. A computer mouse comprising:

a housing;

a pointing component supported by the housing and configured to emulate a computer keyboard input to a computer;

a scanning component supported by the housing and configured to scan an image, the scanning component comprising a first scanning optical system and a second scanning optical system;

a first user-selectable switch supported by the housing and configured to activate the first scanning optical system when scanning an image with the computer mouse in a first direction relative to a document page;

a second user-selectable switch supported by the housing and configured to activate the second scanning optical system when scanning the image with the computer mouse in a second direction relative to the document page, the second direction being different than the first direction; and a function switch supported by the housing, the function switch configured to toggle between a document scan mode in which the computer mouse is configured to scan an image on a document page, and a virtual scan mode in which the computer mouse is configured to scan an image on an electronic page, wherein the electronic page is rendered on a display.

* * * * *